United States Patent [19]
Bruhnke et al.

[11] Patent Number: 5,601,328
[45] Date of Patent: Feb. 11, 1997

[54] BONDED FITTING OF WINDSHIELDS ONTO THE WINDOW APERTURE FLANGE OF MOTOR VEHICLE BODIES

[75] Inventors: Ulrich Bruhnke, Ehningen; Wolfram Frey, Althengstett; Martin Kruse, Bondorf; Anton Epple, Rottenburg; Heinz Faix, Gechingen, all of Germany

[73] Assignee: Mercedes-Benz AG, Stuttgart, Germany

[21] Appl. No.: 488,733

[22] Filed: Jun. 8, 1995

[30] Foreign Application Priority Data

Jun. 24, 1994 [DE] Germany .......................... 44 22 122.3
Oct. 26, 1994 [DE] Germany .......................... 44 38 197.2

[51] Int. Cl.⁶ ........................................ B60J 1/02
[52] U.S. Cl. .................... 296/96.21; 52/208; 156/108
[58] Field of Search .................. 296/84.1, 90, 96.21, 296/146.15, 201; 52/99, 127.1, 208; 156/108, 254

[56] References Cited

FOREIGN PATENT DOCUMENTS

| | | |
|---|---|---|
| 3304981 | 6/1984 | Germany . |
| 3409903 | 10/1984 | Germany . |
| 3324676C1 | 10/1984 | Germany . |
| 3501490 | 7/1986 | Germany . |
| 3500205 | 7/1986 | Germany . |
| 1230894 | 5/1971 | United Kingdom ...................... 52/208 |

*Primary Examiner*—Andrew C. Pike
*Attorney, Agent, or Firm*—Evenson McKeown Edwards & Lenahan, PLLC

[57] ABSTRACT

The bonded fitting of window panes or windshields onto the window-pane flange of the window aperture of a motor-vehicle body has a set bead of adhesive which is applied between those edges of the window pane which are on the inside and the window-pane flange. In this arrangement, in each of the two lower corners there is provided, between the window pane and the bead of adhesive, a respective pressure-sensitive adhesive strip with the adhesive or bonding force reduced on one side. The pressure-sensitive adhesive strip extends from the corners of the window pane along the edges of the window pane in each case for 60 to 120 mm. When removing the window pane the pressure-sensitive adhesive strip in these corners is easily detached without using much force from the inner edge of the window pane by tilting the rest of the window pane which has been cut free.

26 Claims, 5 Drawing Sheets

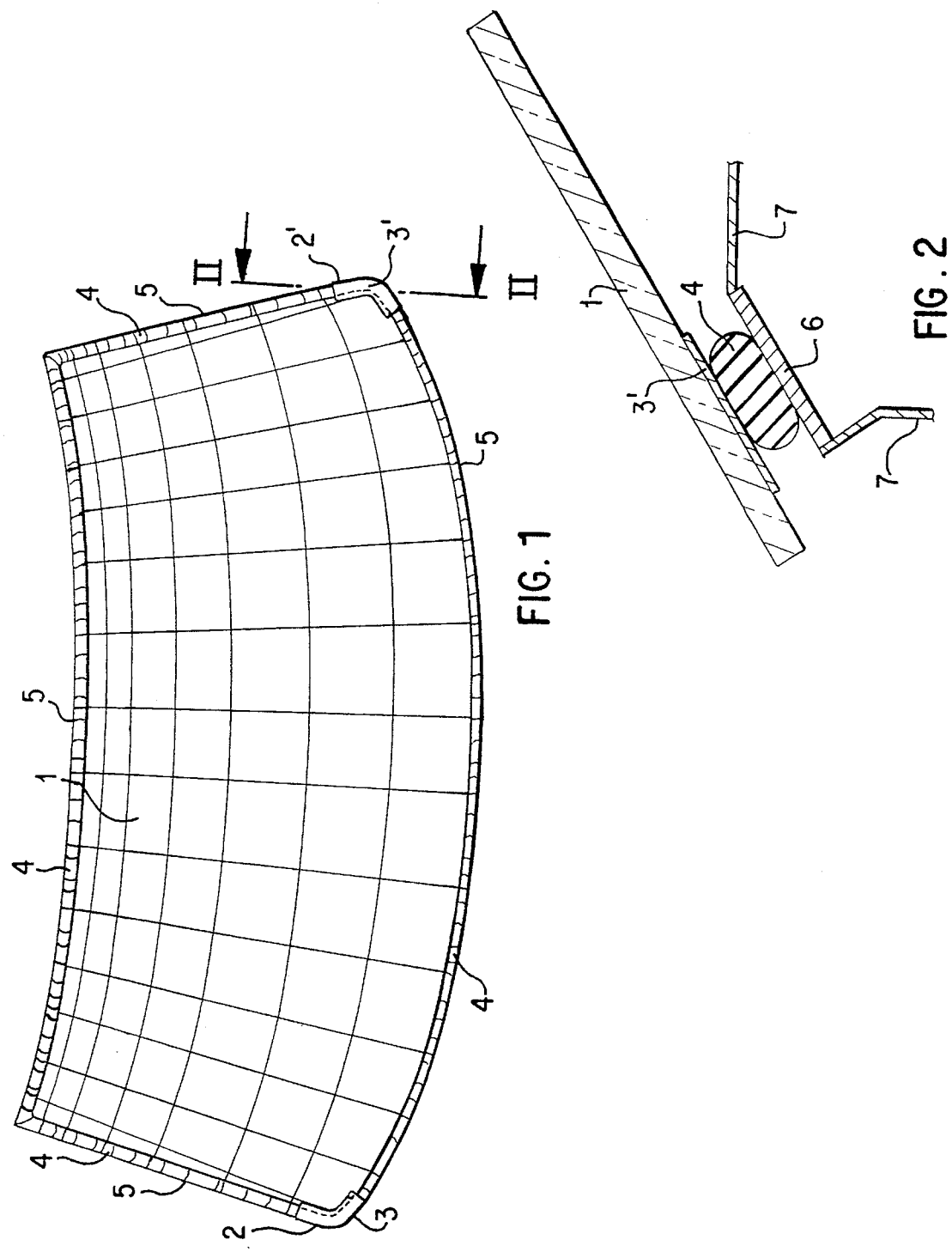

BONDED FITTING OF WINDSHIELDS ONTO THE WINDOW APERTURE FLANGE OF MOTOR VEHICLE BODIES

BACKGROUND AND SUMMARY OF THE INVENTION

The invention relates to the load-bearing bonded fitting of windshields onto the windshield window aperture flange of motor-vehicle bodies by means of a bead of adhesive comprising rapidly setting synthetic material applied between the inside windshield surface and the window aperture flange. German published unexamined patent application 35 00 205 discloses an arrangement of this type which the present invention is directed toward improving.

The motor vehicles produced today have the front windshield, and also the rear windows or windshield, bonded along the entire circumference of the windshield or window directly to the windshield or window flange of the window aperture of the motor-vehicle body. This generally takes place nowadays by means of an adhesive layer designed as a strand or bead of adhesive between the edge regions of the windshield or window surface which is on the inside and the windshield or window flange of the window aperture, as can be seen, for example, from German published unexamined patent applications 34 09 903 and 35 00 205 and from German patent document DE-C 35 01 490.

It is already known from the prior art to arrange a cavity in the bead of adhesive (German application 35 00 205) or, at the same time as the bead of adhesive is applied, to install a flexible cord into the latter (German application 34 09 903), in order to simplify the cutting-out of the windshield or window should the car windshield or rear window need to be removed at a later date when repairing the motor vehicle and/or should the windshield or rear window need to be replaced. However, in the meantime, the use of cutting tools which are equipped with cutters oscillating at high frequency has largely gained acceptance in practice when removing windshields or windows bonded into the motor vehicle bodies (see German patent documents DE-C 33 04 981 and DE-C 33 24 676). In this arrangement, when removing the windshield or window, the bead of adhesive arranged between the windshield or window and the windshield or window flange is normally cut through along the entire circumference of the windshield or window by the cutters.

However, when cutting out the windshields in this manner using the cutting tools there is the problem that the relatively short cutters of the cutting tools can only reach the bead of adhesive in the lower corners of the windshield with difficulty. This problem has hitherto been avoided when designing the motor vehicles by bevelling the lower corners of the windshield in a manner which is favorable for the cutters of the cutting tools to reach them, so as to make the windshield accessible for repair. This led, however, to unattractive, stylistic compromises when realizing the design of the body in the region of the A-pillar of the motor vehicle. Moreover, the problem of manipulating the cutting tools always gave rise to the risk of the paintwork of the motor vehicle body being scratched.

An underlying object of the invention is therefore to provide the load-bearing bonded fitting for windshields, the use of which no longer incurs the disadvantages described above and, accordingly, the windshields can be realized solely with the design of the body in mind.

This object is achieved according to the invention by providing an arrangement comprising a load-bearing bonded fitting of a windshield onto a windshield flange of a window aperture of a motor vehicle body, comprising a bead of adhesive formed of rapidly setting synthetic material applied between an inside windshield surface and a windshield flange, and a pressure-sensitive adhesive strip attached between the windshield and the bead of adhesive at each of two lower corners of the windshield, said pressure-sensitive adhesive strip having respective adhesive sides facing the inside windshield surface and being permanently flexible, said pressure-sensitive adhesive strip at the two lower corners of the windshield serving to accommodate removal of the windshield without requiring cutting of the bead of adhesive in the region of the two lower corners where the bead of adhesive is covered by the respective pressure-sensitive adhesive strips.

The bonded fitting according to the invention means that it is no longer necessary to cut through the regions of the bead of adhesive in the lower corners of the windshield using the cutter. The adhesive bonding of the pressure-sensitive adhesive strip is less capable of bearing a load and it is merely this which is effective in the lower corner regions of the windshield. When removing the windshield—after the bead of adhesive has been cut through along the rest of the circumference of the windshield—the relatively short regions of the pressure-sensitive adhesive strip can be detached from the windshield without great use of force by careful, manual tilting of the rest-of the windshield, which has been cut free, forwards out of the interior of the vehicle around the lower edge of the windshield.

The pressure-sensitive adhesive strip which bears on the bead of adhesive is preferably designed such that it is wider than the width of the bead of adhesive where the bead is present in a pressed-flat state in the region of the pressure-sensitive adhesive strip.

The bead of adhesive consists of an adhesive generally used in the motor-vehicle industry comprising a two-pack or single-pack polyurethane adhesive or polysulphide adhesive which sets in atmospheric moisture. Alternatively, the bead of adhesive comprises a butyl rubber adhesive.

According to certain preferred embodiments, the pressure-sensitive adhesive strip comprises, with the exception of the pressure-sensitive adhesive, a closed-cell strip of foam made of a permanently flexible plastic.

In order to ensure that the pressure-sensitive adhesive strip has a long service life, in particular in order to protect it against the effect of UV radiation from the atmosphere, UV stabilizers are advantageously added to the material of the pressure-sensitive adhesive strip in certain preferred embodiments.

As described above, in order to remove bonded windshields or windows, the bead of adhesive arranged between the windshield or window and the windshield or window flange is cut through along the entire circumference of the windshield or window by oscillating cutters. Since when cutting out in this manner the relatively short cutters can only reach the bead of adhesive in the lower corners of the windshield with difficulty, in particular if the lower corners are designed such that they are stylistically attractive in the region of the A-pillar of the motor vehicle, it is proposed above to design the bond such that it does not pose a problem when carrying out repair work by providing, in each of the two lower corners of the windshield, a respective pressure-sensitive adhesive strip between the windshield and the bead of adhesive, which is designed such that it is permanently flexible in its wall thickness and faces the inner windshield surface with its adhesive side, the pressure-sensitive adhesive strip preferably extending from the corners in each case for approximately 60 to 120 mm along the lower and the side edges of the windshield. This measure aims to obtain, in the lower corner regions of the windshield, an adhesive bonding of the pressure-sensitive adhesive strip which is less capable of bearing a load and has the result that, after the bead of adhesive has been cut through along the entire circumference of the windshield, when removing the windshield and while carefully and manually tilting the windshield out of the interior of the vehicle around the lower edge of the windshield, the pressure-sensitive adhesive strips are intended to be ripped open and hence also the bonded joint is intended to be severed there. The pressure-sensitive adhesive strip which bears on the-bead of adhesive is preferably designed such that it is wider than the width of the bead of adhesive when the bead is in a pressed-flat state. The pressure-sensitive adhesive strip is preferably composed of a strip of closed-cell foam made of a permanently flexible plastic.

It has also been learned that it is difficult to realize a bond in the corner regions which, on the one hand, is indeed less capable of bearing a load but, on the other hand, is absolutely watertight and which can be readily severed without destroying the windshield when tilting and pressing out the latter. It is especially difficult to realize such a bond if the corner regions, which are designed separately for bonding purposes, are of somewhat longer dimensions, i.e., approximately 100 mm or more per limb or branch from the corner. The corner bonds which have not been cut free could therefore be more stable than the windshield when commercially available strips of foam were used and, as a result, the windshield could break, as in prior arrangements without the pressure-sensitive strips at the lower corners of the window.

It is therefore a further object of the invention to develop the separately designed bond of the corner regions to such an extent that the corner bonds do indeed, on the one hand, become detached in every case when manually pressing out the rest of the windshield which has been cut free, without exerting force on the windshield, but, on the other hand, that the window-pane bond is permanently watertight even in the corner region.

This last mentioned object is achieved according to preferred embodiments of the invention by providing further features. A first feature is to provide the-pressure-sensitive adhesive strip with adhesion reducing material at its side facing the bead of adhesive. A second feature is to provide a strip-shaped track of pressure-sensitive adhesive on the side of the pressure-sensitive strip facing the window, which track is narrower than the pressure-sensitive strip. Embodiments are also contemplated which include a combination of these last mentioned features. According to these features the intention is for a pressure-sensitive adhesive strip to be used which has an adhesive or bonding force which is reduced at least on one side in order to ensure reliable detachment of the bond in the corner region, but on the other hand the adhesive or bonding action has in all cases to be sufficiently effective to permanently and completely prevent water from penetrating through the bonded joint, for example, due to a capillary or creeping action.

Other objects, advantages, and novel features of the present invention will become apparent from the following detailed description of the invention when considered in conjunction with the accompanying drawings.

BRIEF DESCRIPTION OF THE DRAWINGS

FIG. 1 is a plan view of a windshield which has been cut free from the side flanges of a window aperture, constructed according to a preferred embodiment of the invention;

FIG. 2 is a side view of a windshield bonded to the lower windshield flange of the window aperture, taken along line II—II of FIG. 1;

DETAILED DESCRIPTION OF THE PREFERRED EMBODIMENT

Figure 3:
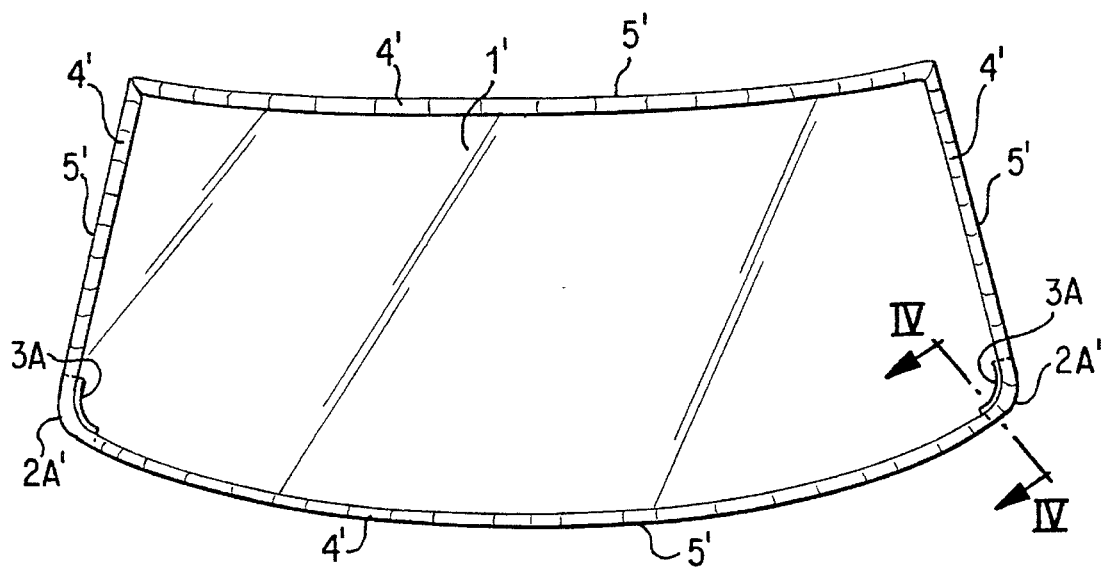
FIG. 3 is a plan view of a windshield prepared for being bonded onto the window-pane flange of a window aperture, constructed according to another preferred embodiment of the invention.

In FIG. 1, a windshield is shown, the lower corners 2 and 2' of which have pressure-sensitive adhesive strips 3 and 3' arranged on the inside. A bead of adhesive 4 runs along the side edges 5 of the windshield 1, which as shown has been cut through and which is bonded on the inside to the side edges 5 of the windshield 1.

Referring to FIG. 2, the windscreen 1 and the pressure-sensitive adhesive strip 3 adhering on the inside to the windshield 1 are shown. The bead of adhesive 4 is bonded with its surface lying opposite the pressure-sensitive adhesive strip 3 to the lower windshield flange 6. Cross-members 7 in the vehicle body support the lower windshield flange 6.

The advantages obtained with the subject matter of the preferred embodiments of the invention consist in particular in the fact that when the windshield is removed from the windshield flange of the window aperture of a motor vehicle, the beads of adhesive in the lower corners, which can only be reached with difficulty with the cutting tool, no longer have to be cut through. This means that time is saved when removing the windshield and also that the risk of producing scratches on the paintwork of the body is reduced. The creative freedom with regard to the construction and design of the body in the lower corner regions of the windshield frame is increased; visually unattractive compromises no longer have to be taken in respect of designing the body with regard to the windshield being constructed such that it is accessible for repair.

Figure 4:
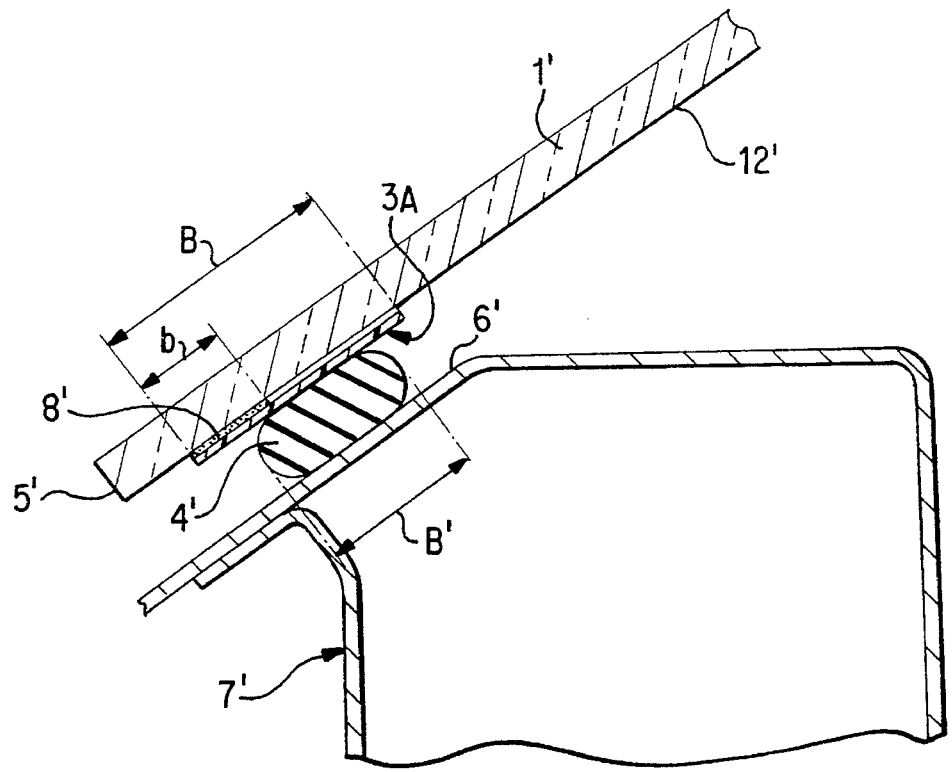
FIG. 4 is a cross-sectional view through the windshield bond and the lower window-pane flange of the window aperture along a line of intersection IV—IV indicated in FIG. 3.
Figure 5:
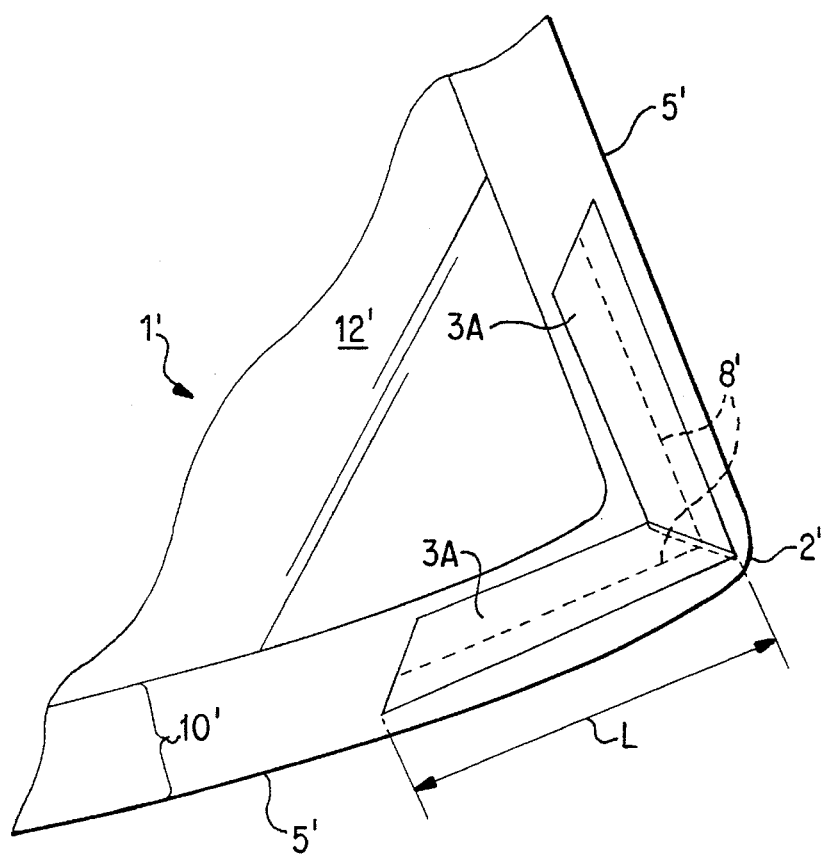
FIG. 5 shows a separate enlarged view of a windshield corner in plan view before the beads of adhesive are applied, constructed according to preferred embodiments of the invention.

FIGS. 3 and 4 show the bonded fitting of a window pane or windshield in which the windshield 1' is bonded in a load-bearing manner onto the window-pane flange 6' of the window aperture of a motor-vehicle body, which flange is constructed in the region of a cross-member 7'. More specifically a bead of adhesive 4' comprising a rapidly setting synthetic material is applied to the window surface 12' on the inside. A windshield prepared in the manner described below is then pressed onto the windshield flange 6' of the window aperture and the adhesive is then set. In each of the two lower corners 2A' of the windshield there is attached, before the beads of adhesive are applied, a respective pressure-sensitive adhesive strip 3A which faces the inner windshield surface with its adhesive side so that said strip comes to rest between the windshield and the bead of adhesive, i.e., the applied pressure-sensitive adhesive strips are likewise covered by the bead of adhesive in the case of the windshield 1' prepared for bonding in. The pressure-sensitive adhesive strips are of a length such that they extend from the corners of the windshield along the edges 5' of the windshield in each case for 60 to 120 mm—length L as depicted in FIG. 5. The actual length of the pressure-sensitive adhesive strips depends in each case on the specific conditions; they have to be dimensioned such that they are of the same length as the region which cannot be reached by the windshield removal cutters.

Figure 8:
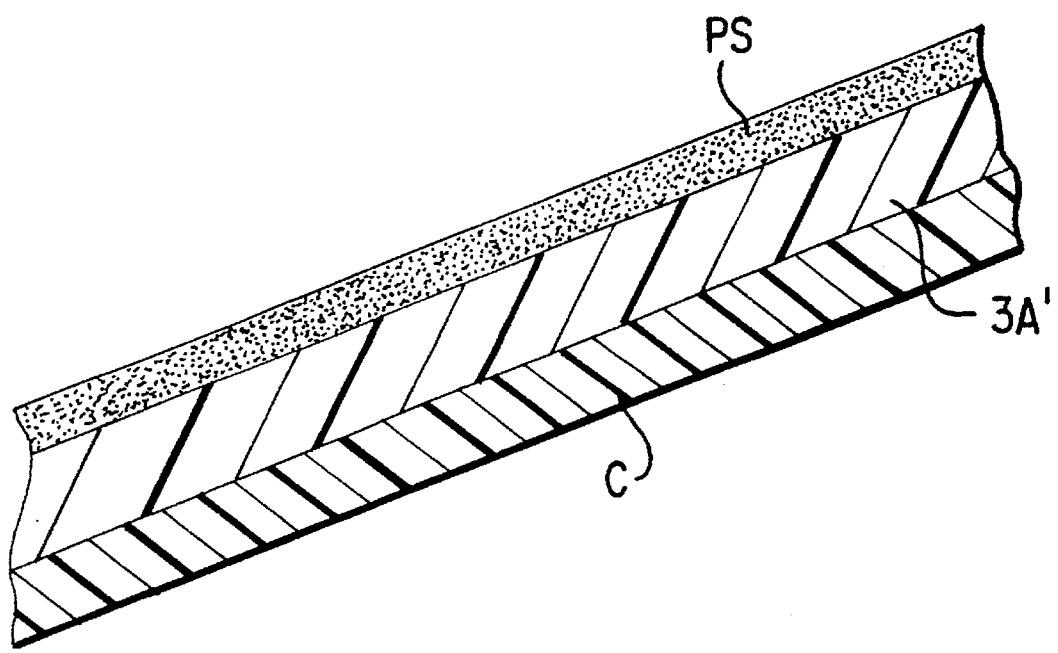
FIG. 8 is a cross-sectional view of a modified embodiment of a pressure-sensitive adhesive strip for use with the embodiment for FIG. 4.
Figure 9:
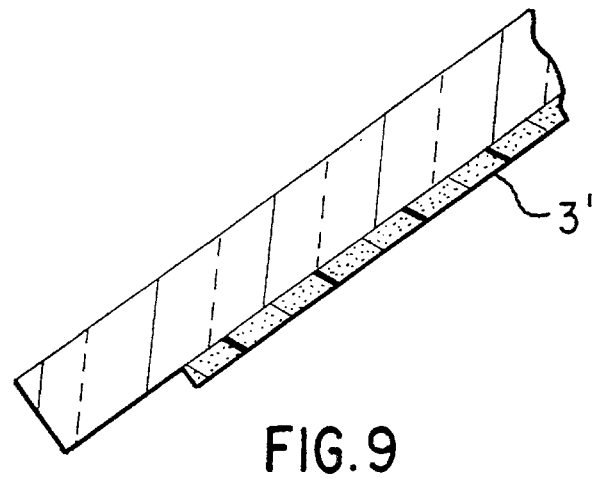
FIG. 9 is an enlarged schematic sectional view of a pressure sensitive adhesive strip for use with the embodiment of FIG. 2.

In order for the corner bonds to be detached, in the event of repair, without the exertion of force when manually pressing out the rest of the windshield which has been cut free, but on the other hand, for the windshield bond nevertheless to be permanently watertight even in the corner region, the pressure-sensitive adhesive strip, which is composed of a thin, pore-free closed cell strip of foam film made of a permanently flexible plastic, is provided on the side facing the bead of adhesive with a coating which reduces the bonding force. FIG. 8 schematically depicts a strip 3A' with a coating C. FIG. 9 is an enlarged schematic sectional view of strip 3' showing the closed cell foam film of flexible plastic. The type of coating must be carefully matched to the adhesive of the bead of adhesive because the intention is for a certain amount of adhesive force to remain at all times in order to keep the bond permanently watertight even in the corner region. In the case of this alternative of FIG. 8, the pressure-sensitive adhesive strip is advantageously coated over its entire surface on the side facing the windshield with a pressure-sensitive adhesive PS composed of weather resistant acrylate. In every case, and this also applies to the alternative described below of the invention, it has to be ensured, by dimensioning the pressure-sensitive adhesive strips such that they are of a sufficient width, that after the windshield has been inserted and the beads of adhesive have been pressed flat, said beads of adhesive 4, 4' do not directly come into contact in the corner region with the glass surface. The pressure-sensitive adhesive strip with the width B must therefore be at least as wide as the pressed-flat bead of adhesive (dimension B'). In order to be able to compensate for position and width tolerances of the bead of adhesive and of the pressure-sensitive adhesive strip, it is, however, an advantage for the pressure-sensitive adhesive strip to have an excess width.

Figure 10:
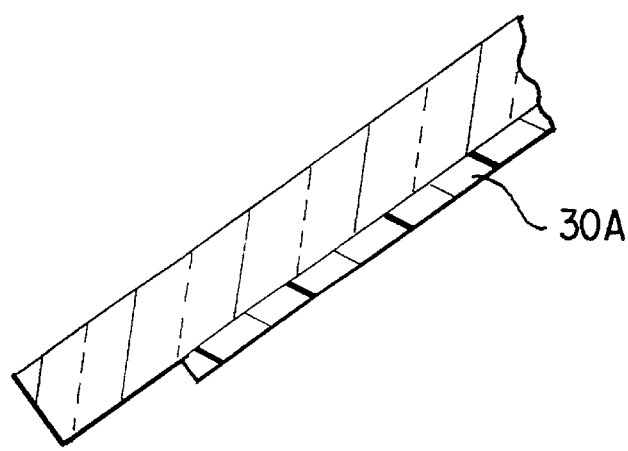
FIG. 10 is an enlarged schematic sectional view of a pressure sensitive strip made of plastic for use with the embodiment of FIG. 4.
Figure 11:
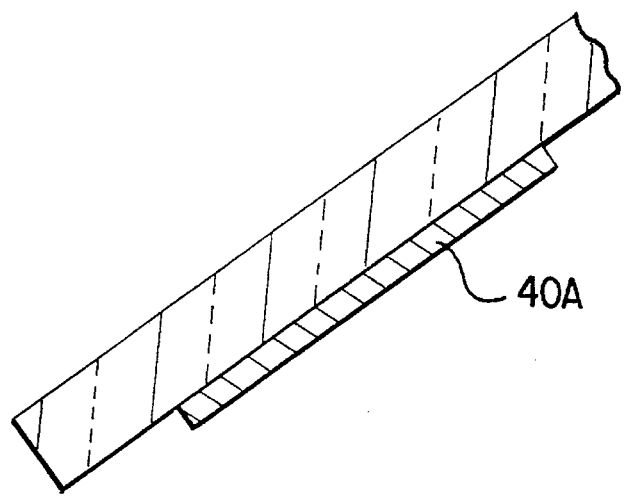
FIG. 11 is an enlarged schematic sectional view of a pressure sensitive strip made of metal for use with the embodiment of FIG. 4.

Instead of reducing the bonding force on the bead of adhesive side, another embodiment of the invention is shown in drawing FIGS. 3 to 7, which provides that the pressure-sensitive adhesive strip 3A, which is made of a pore-free strip of film 3A' (FIG. 6 or 7), is provided on the side facing the windshield with a strip-shaped track 8' with the width b of pressure-sensitive adhesive, which width b is designed such that it is narrower than the pressure-sensitive adhesive strip. In preferred embodiments the adhesive strip 3A is composed of material including UV stabilizers. The reduced width of adhesion—dimension b—also brings about a corresponding reduction in the adhesive force. In this arrangement the pressure-sensitive adhesive strip may consist of a plastic strip 30A as depicted in FIG. 10 or of a metal strip 40A as depicted in FIG. 11. Suitable film thicknesses lie in the range of 0.03 to 0.3 mm. The thinner the film the less is the risk of the bond at the "step" of the end of the strip and of the beginning of the strip starting to leak. On the other hand, the film has, of course, to be of sufficient thickness that it can still be handled and applied without being damaged. The pressure-sensitive adhesive applied to the pressure-sensitive adhesive strip on the side facing the windshield is a weather-resistant acrylate adhesive which is the best guarantee of permanent waterproofing. UV resistance of the pressure-sensitive adhesive or of the material of the adhesive strip need not be required if, as is generally the case, the bond is in any case effectively protected against the admission of UV light by the edge of the windshield—region 10'—being blackened (FIG. 5). The width b of the strip-shaped track 8' of pressure-sensitive adhesive on the pressure-sensitive strip can be approximately 10 to 50% of the width B of the pressure-sensitive adhesive strip, preferably approximately 15 to 30%.

Figure 6:
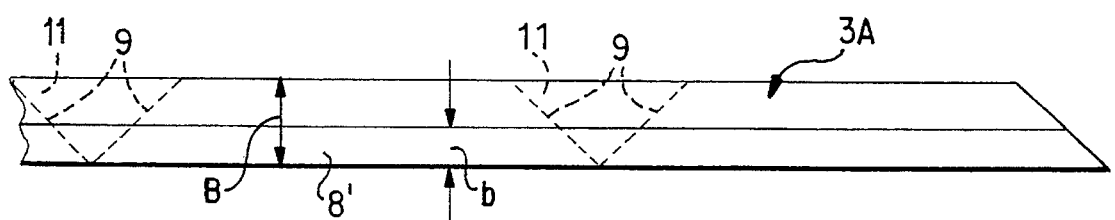
FIG. 6 shows the developed view of a segment of a quasi-endless pressure-sensitive adhesive strip with an eccentric arrangement of the pressure-sensitive adhesive track and with a bevelled perforation of individual portions in accordance with their use, constructed according to preferred embodiments of the invention.
Figure 7:
FIG. 7 shows the developed view of another exemplary embodiment of a quasi-endless pressure-sensitive adhesive strip with a central arrangement of the pressure-sensitive adhesive track and with a bevelled perforation of individual portions in accordance with their use.

The strip shaped track 8' of pressure-sensitive adhesive on the pressure-sensitive adhesive strip preferably runs eccentrically (FIGS. 5 and 6), to be precise, offset in the direction towards the outer edge. This achieves two advantageous in use. On the one hand, the creep distance of the water present on the outside is shorter than when the adhesive track is in the central position (see 8" in FIG. 7); the creep distance can even be eliminated entirely if the adhesive track is in a position totally on the edge. On the other hand, the resistance of the bonded joint against the windshield being tilted out is less than when the adhesive track is in a central position. The eccentric arrangement of the adhesive track does, however, require—as can be seen in FIG. 6—certain waste pieces 11 on the strip 3A of film to be punched out in order always to obtain pressure-sensitive adhesive strips 3A cut out to meet requirements. The punching out can take place by means of prefabricated perforations 9. When the adhesive track 8' is in a central position (FIG. 7), the required pressure-sensitive adhesive strips can be manufactured without waste.

When the pressure-sensitive adhesive strips are being arranged and applied it is important for the pressure-sensitive tracks 8' of the two pressure-sensitive adhesive strips which abut against each other along a bevelled line in the corner region to directly adjoin each other taking account of their relative position in width within the pressure-sensitive adhesive strips and for them not to come to rest somewhat laterally offset with respect to each other. The pressure-sensitive adhesive strips are advantageously applied such that they overlap in the corner region in order at this point reliably to prevent a gap between the pressure-sensitive adhesive strips.

The advantages which can be obtained with the subject matter of the invention consist in particular of the fact that when the windshield is removed from the windshield flange of the window aperture of a motor vehicle, the beads of adhesive in the lower corners, which can only be reached with difficulty, if at all, with the cutting tool, no longer have to be cut through. This means that time is saved when removing the windshield; the risk of producing scratches on the paintwork of the body is reduced too. The creative freedom with regard to the construction and design of the body in the lower corner regions of the windshield frame is increased; visually unattractive compromises no longer have to be made in respect of designing the body with regard to the windshield being constructed such that it is accessible for repair.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Load-bearing bonded fitting of a windshield onto a windshield flange of a window aperture of a motor vehicle body, said bonded fitting comprising:

a bead of adhesive formed of rapidly setting synthetic material applied between an inside windshield surface and the windshield flange, and a pressure-sensitive adhesive strip attached between the windshield and the bead of adhesive at each of two lower corners of the windshield, said pressure-sensitive adhesive strips having respective adhesive sides facing the inside windshield surface and being permanently flexible, said pressure-sensitive adhesive strips at the two lower corners of the windshield serving to accommodate removal of the windshield without requiring cutting of the bead of adhesive in a region of the two lower corners where the bead of adhesive is covered by the respective pressure-sensitive adhesive strips.

2. Bonded fitting according to claim 1, wherein each of said pressure-sensitive strips extends between 60 mm and 120 mm along respective lower edges and side edges of the windshield at said lower corners.

3. Bonded fitting according to claim 2, wherein the pressure-sensitive strips are wider than the bead of adhesive covered thereby when the bead of adhesive is in a pressed flat condition corresponding to in-use holding of the windshield at the windshield flange.

4. Bonded fitting according to claim 3, wherein the pressure-sensitive adhesive strips are composed of a closed cell strip of foam film made of a permanently flexible plastic.

5. Bonded fitting according to claim 2, wherein the pressure-sensitive adhesive strips are composed of a closed cell strip of foam film made of a permanently flexible plastic.

6. Bonded fitting according to claim 1, wherein the pressure-sensitive strips are wider than the bead of adhesive covered thereby when the bead of adhesive is in a pressed flat condition corresponding to in-use holding of the windshield at the windshield flange.

7. Bonded fitting according to claim 6, wherein the pressure-sensitive adhesive strips are composed of a closed cell strip of foam film made of a permanently flexible plastic.

8. Bonded fitting according to claim 1, wherein the pressure-sensitive adhesive strips are composed of a closed cell strip of foam film made of a permanently flexible plastic.

9. Bonded fitting according to claim 8, wherein the plastic of the pressure-sensitive adhesive strips is composed of material including UV stabilizers.

10. Bonded fitting according to claim 1, wherein the pressure-sensitive adhesive strips are composed of material including UV stabilizers.

11. Bonded fitting according to claim 1, wherein each of the pressure-sensitive adhesive strips are made of a pore-free strip of film provided on a side thereof facing the bead of adhesive with adhesion reducing material which reduces the adhesion between the bead of adhesive and the respective pressure-sensitive strip.

12. Bonded fitting according to claim 11, wherein said adhesion reducing material is in a form of a coating.

13. Bonded fitting according to claim 12, wherein each said pore-free strip of film consists of plastic or of a metal.

14. Bonded fitting according to claim 12, wherein each said pore-free strip of film has a thickness of approximately 0.03 to 0.3 mm.

15. Bonded fitting according to claim 12, wherein a pressure-sensitive adhesive composed of weather-resistant acrylate is applied to each said pressure-sensitive adhesive strip on the side facing the inside windshield surface.

16. Bonded fitting according to claim 12, wherein the pressure-sensitive adhesive strips are applied in a manner such that they overlap in the respective corner region.

17. Bonded fitting according to claim 12, wherein each said pressure-sensitive adhesive strip is coated over an entire surface thereof on the side facing the inside windshield surface with a pressure-sensitive adhesive.

18. Bonded fitting according to claim 11, wherein said adhesion reducing material is in a form of a strip-shaped track of pressure-sensitive adhesive on each said pressure-sensitive adhesive strip.

19. Bonded fitting according to claim 18, wherein each said pore-free strip of film consists of plastic or of a metal.

20. Bonded fitting according to claim 19, wherein each said strip-shaped track extends eccentrically offset in a direction towards an outer edge of the windshield when in an in-use installed position.

21. Bonded fitting according to claim 18, wherein each said pore-free strip of film has a thickness of approximately 0.03 to 0.3 mm.

22. Bonded fitting according to claim 18, wherein each of said strip-shaped track of said pressure-sensitive adhesive is comprised of a weather-resistant acrylate adhesive.

23. Bonded fitting according to claim 18, wherein the pressure-sensitive adhesive strips are applied in a manner such that they overlap in the respective corner region.

24. Bonded fitting according to claim 18, wherein each said pressure-sensitive adhesive track includes two pressure-sensitive adhesive strips, which directly adjoin each other and abut against each other along a bevelled line in a the respective corner region.

25. Bonded fitting according to claim 18, wherein width of each said strip-shaped track has a width which is approximately 10% to 50% of a width of the respective pressure-sensitive adhesive strip.

26. Bonded fitting according to claim 18, wherein each said strip-shaped track has a width which is approximately 15%–30% of a width of the respective pressure-sensitive adhesive strip.

* * * * *